US 9,405,557 B2

(12) United States Patent
Park

(10) Patent No.: US 9,405,557 B2
(45) Date of Patent: Aug. 2, 2016

(54) METHOD AND APPARATUS FOR PROVIDING A REMOTE CONTROL USER INTERFACE

(75) Inventor: Ho-Yeon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 52 days.

(21) Appl. No.: 13/309,159

(22) Filed: Dec. 1, 2011

(65) Prior Publication Data

US 2012/0143945 A1    Jun. 7, 2012

(30) Foreign Application Priority Data

Dec. 2, 2010  (KR) ........................ 10-2010-0121902

(51) Int. Cl.
G06F 15/173     (2006.01)
G06F 9/44       (2006.01)

(52) U.S. Cl.
CPC ................................... *G06F 9/4445* (2013.01)

(58) Field of Classification Search
CPC ........................... H04L 67/125; H04L 67/025
USPC ................................................. 709/201, 203
See application file for complete search history.

(56) References Cited

U.S. PATENT DOCUMENTS

| | | | |
|---|---|---|---|
| 6,286,003 B1* | 9/2001 | Muta | |
| 6,466,971 B1* | 10/2002 | Humpleman et al. | 709/220 |
| 7,577,910 B1 | 8/2009 | Husemann et al. | |
| 2002/0035621 A1* | 3/2002 | Zintel et al. | 709/220 |
| 2003/0139175 A1* | 7/2003 | Kim | 455/419 |
| 2005/0120082 A1* | 6/2005 | Hesselink et al. | 709/203 |
| 2009/0062939 A1 | 3/2009 | Park | |
| 2009/0268754 A1* | 10/2009 | Palm et al. | 370/466 |
| 2010/0211883 A1 | 8/2010 | Lee et al. | |

FOREIGN PATENT DOCUMENTS

| | | |
|---|---|---|
| CN | 101378568 | 3/2009 |
| EP | 2 031 848 | 3/2009 |
| KR | 1998-079592 | 11/1998 |
| KR | 1020010029916 | 4/2001 |
| KR | 1020090083612 | 8/2009 |
| KR | 1020100019732 | 2/2010 |

OTHER PUBLICATIONS

Chinese Office Action dated Apr. 3, 2015 issued in counterpart application No. 201180058147.0.

* cited by examiner

*Primary Examiner* — Wing F Chan
*Assistant Examiner* — Andrew Woo
(74) *Attorney, Agent, or Firm* — The Farrell Law Firm, P.C.

(57) ABSTRACT

A method and an apparatus are provided for providing a remote User Interface (UI) to a terminal in a remote UI system. The method includes downloading, by the first terminal, an application from a remote server; driving the application; requesting a new application from the remote server; receiving the new application from the remote server; driving the new application; requesting a second terminal to a change the control UI according to the new application; receiving a message requesting a new control UI for controlling the new application from the second terminal; and providing the new control UI for controlling the new application to the second terminal in response to the message.

16 Claims, 8 Drawing Sheets

| BOOLEAN changeCUI (string requestURL) | | |
|---|---|---|
| ARGUMENTS | requestURL | - CONTROL UI REQUEST URL INCLUDING "/rcf/request_cui" |
| | | - CONTROL UI CHANGE URL BY TRANSFERRING COMMAND MESSAGE INCLUDING "/rcf/request_msg" |
| | | - CONTROL UI CHANGE URL BY CREATING NEW APPLICATION INCLUDING "/rcf/create_app" |

FIG.8

METHOD AND APPARATUS FOR PROVIDING A REMOTE CONTROL USER INTERFACE

PRIORITY

This application claims priority under 35 U.S.C. §119(a) to Korean Application Serial No. 10-2010-0121902, which was filed in the Korean Industrial Property Office on Dec. 2, 2010, the entire content of which is hereby incorporated by reference.

BACKGROUND OF THE INVENTION

1. Field of the Invention

The present invention relates generally to a remote User Interface (UI) system, and more particularly, to a method and an apparatus for providing a remote UI to a terminal in the remote UI system.

2. Description of the Related Art

Research for enhancing home network technology has been actively advanced by many industry standard organizations, such as Digital Living Network Alliance (DLNA), Home Audio-Video Interoperability (HAVi), Universal Plug and Play (UPnP), etc.

Among this home network technology, Remote UI (RUI) technology may be used by an apparatus to control a function of another apparatus in a home network. RUI technology is based on client-server architecture, in which a user may control an RUI server through a UI of an RUI client.

FIG. 1 is a block diagram illustrating a conventional remote UI system.

Referring to FIG. 1, the remote UI system includes a remote server 100, i.e., an RUI server, a first terminal 110, and a second terminal 120. The second terminal 120 controls the first terminal 110 and includes a UI Control Point (UICP) 121 for discovering the first terminal 110. For example, the UICP 121 is a logical entity. Alternatively, the UICP 121 may be located outside of the second terminal 120.

The first terminal 110 receives a remote server application (not shown) from the remote server 100, and a handler 111 therein executes the remote server application. The remote server application has a Remote Control Function (RCF) object for communicate with an RCF plug-in 112, and therefore, the remote server application provides a control UI to the second terminal 120 and communicates with the control UI driven in the second terminal 120.

A request of the second terminal 120 is transmitted to an embedded server 113 in the first terminal 100. The embedded server 113 transfers the request of the second terminal 120 to the RCF plug-in 112, and then, the RCF plug-in 112 transfers the request to the remote server application having the RCF object.

FIGS. 2 and 3 are signal flow diagrams illustrating conventional methods for transferring the control UI to the second terminal in the prior remote UI system, respectively.

Referring to FIG. 2, when the second terminal 120 is driven, e.g., powered on, in step 201, the second terminal 120 discovers the first terminal 110 and obtains information (i.e., Description information) about the first terminal 101 in step 202. In step 203, the second terminal 120 requests a remote UI list from the embedded server 113 and then receives the requested remote UI list from the embedded server 113. In step 204, the second terminal 120 selects a remote UI from the remote UI list. In step 205, the second terminal 120 requests the embedded server 113 of the first terminal 110 to provide the selected remote UI.

In steps 206 to 212, the embedded server 113 obtains the requested remote UI from the remote server 100 and transmits the obtained remote UI to the second terminal 120.

Referring to FIG. 3, when the second terminal 120 requests a remote server application change from the embedded server 113 in step 301, the embedded server 113 sends the remote server application change to the remote server application 114 in steps 302 to 304. In steps 305 and 306, the remote server application 114 obtains a new remote server application from the remote server 100, and drives the new remote server application in step 307. In steps 308, the remote server application 114 requests a control UI for controlling the new remote server application from the remote server 100. In step 309, the remote server application 114 receives the requested control UI from the remote server 100.

In steps 310 to 312, the remote server application 114 transfers the control UI to the second terminal 120 through the embedded server 113.

As described above, in the prior art, the first terminal 110 transfers the control UI to the second terminal 120, after there is a request for the control UI by the second terminal 120.

FIGS. 4 and 5 are screen views illustrating some problems associated with conventional methods of transferring a control UI to a second terminal.

For example, as illustrated in FIG. 4, when playback soap opera content in the first terminal 110 is over, a display screen of the first terminal 110 remains in a state that the soup opera is over. At this time, the user requests a control UI change through the second terminal 120. Then, the first terminal 110 first changes a remote server application and provides a control UI for controlling the changed remote server application to the second terminal 120.

Accordingly, as illustrated in FIG. 5, when a remote server application in the first terminal 120 is automatically changed into another remote server application without a request by the second terminal 120, a control UI of the second terminal 120 is not changed. That is, the second terminal 120 can no longer control a new remote server application operated in the first terminal 120.

SUMMARY OF THE INVENTION

Accordingly, the present invention is designed to address the above-mentioned problems occurring in the prior art and to provide at least the advantages described below.

An aspect of the present invention is to provide an apparatus and a method for providing a control UI that controls a new remote server application in a second terminal, when a remote server application in a first terminal is changed into the new remote server application, without a request by the second terminal.

In accordance with an aspect of the present invention, a method for providing a control UI in a remote UI system is provided. The method includes downloading, by the first terminal, an application from a remote server; driving the application; requesting a new application from the remote server; receiving the new application from the remote server; driving the new application; requesting a second terminal to a change the control UI according to the new application; receiving a message requesting a new control UI for controlling the new application from the second terminal; and providing the new control UI for controlling the new application to the second terminal in response to the message.

In accordance with another aspect of the present invention, a terminal apparatus for providing a control UI in a remote server is provided. The terminal apparatus includes a handler for driving an application downloaded from the remote server; a Remote Control Function Control Point (RCF CP) for sending a control UI change request to another terminal, when a new application is driven by the handler without a request from the another terminal; and an embedded server for receiving a message requesting a new control UI for controlling the new application from the another terminal and providing the new control UI for controlling the new application to the another terminal.

BRIEF DESCRIPTION OF THE DRAWINGS

The above and other aspects, features, and advantages of certain embodiments of the present invention will be more apparent from the following detailed description taken in conjunction with the accompanying drawing, in which:

FIG. 8 illustrates a "changeCUI API" according to an embodiment of the present invention.

DETAILED DESCRIPTION OF THE EMBODIMENTS OF THE INVENTION

Hereinafter, various embodiments of the present invention will be described with reference to the accompanying drawings. In the following description, detailed descriptions of known functions and configurations incorporated herein will be omitted to avoid obscuring the subject matter of the present invention. Further, while many of the following terms are defined considering their roles or functions, but these terms may be varied in accordance with intention of a user or an operator, or custom. Therefore, the definition of the terms should be considered based on the whole description of the specification.

In the description below, a terminal to which a control UI is provided is referred to as a second terminal, and a terminal that provides a control UI to the second terminal is referred to as a first terminal. In the embodiments described below, the second terminal corresponds to an RUI client, and the first terminal corresponds to a terminal including an embedded server that provides a control UI to the second terminal. Further, the first terminal includes a handler, which is capable of communicating with a remote server, for receiving a remote server application from the remote server, and driving the received remote server application.

In accordance with an embodiment of the present invention, a scheme of providing a control UI is provided, which controls a new remote server application, in the second terminal, when a remote server application driven in the first terminal is changed into the new remote server application. Accordingly, a need exists for a method of requesting a control UI change from an RCF plug-in, by a remote server application driven within the first terminal, and for defining an entity and its operation for requesting the control UI from second terminal, according to the request by the remote server application.

According to an embodiment of the present invention, by transmitting a request for a control UI change to the first terminal, in order to control a new remote server application that is changed to in the first terminal, the second terminal requests a control UI for controlling the changed new remote server application from the first terminal and obtains the requested control UI from the first terminal.

Figure 1:
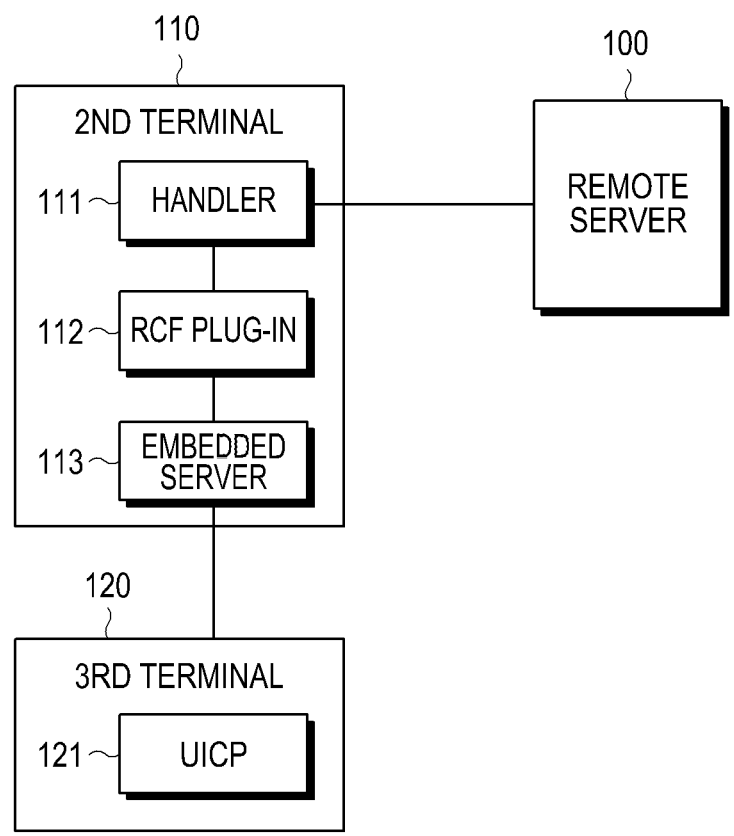
FIG. 1 is a block diagram illustrating a conventional remote UI system.
Figure 2:
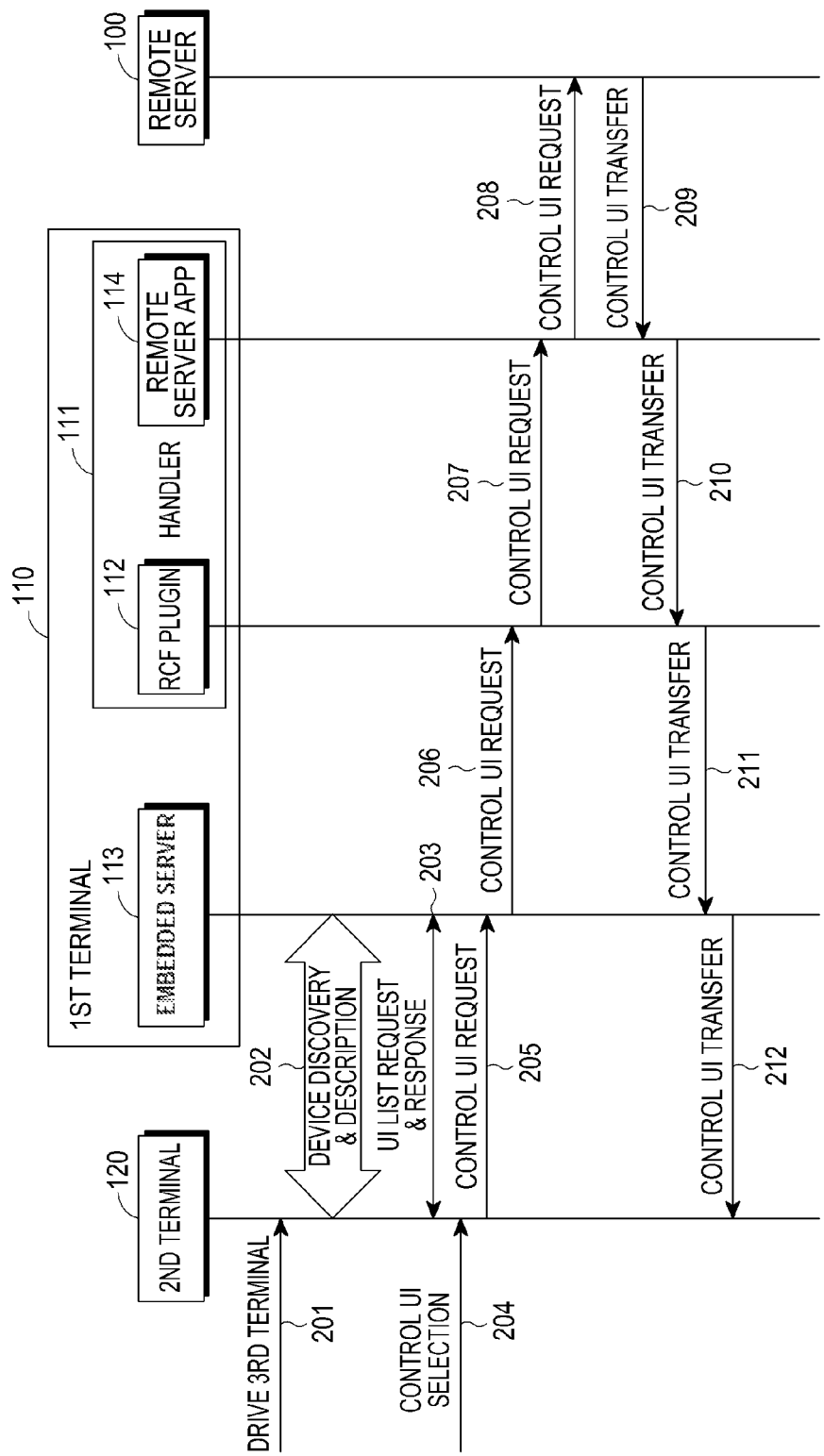
FIGS. 2 and 3 are signal flow diagrams illustrating conventional methods for transferring a control UI to a second terminal.
Figure 3:
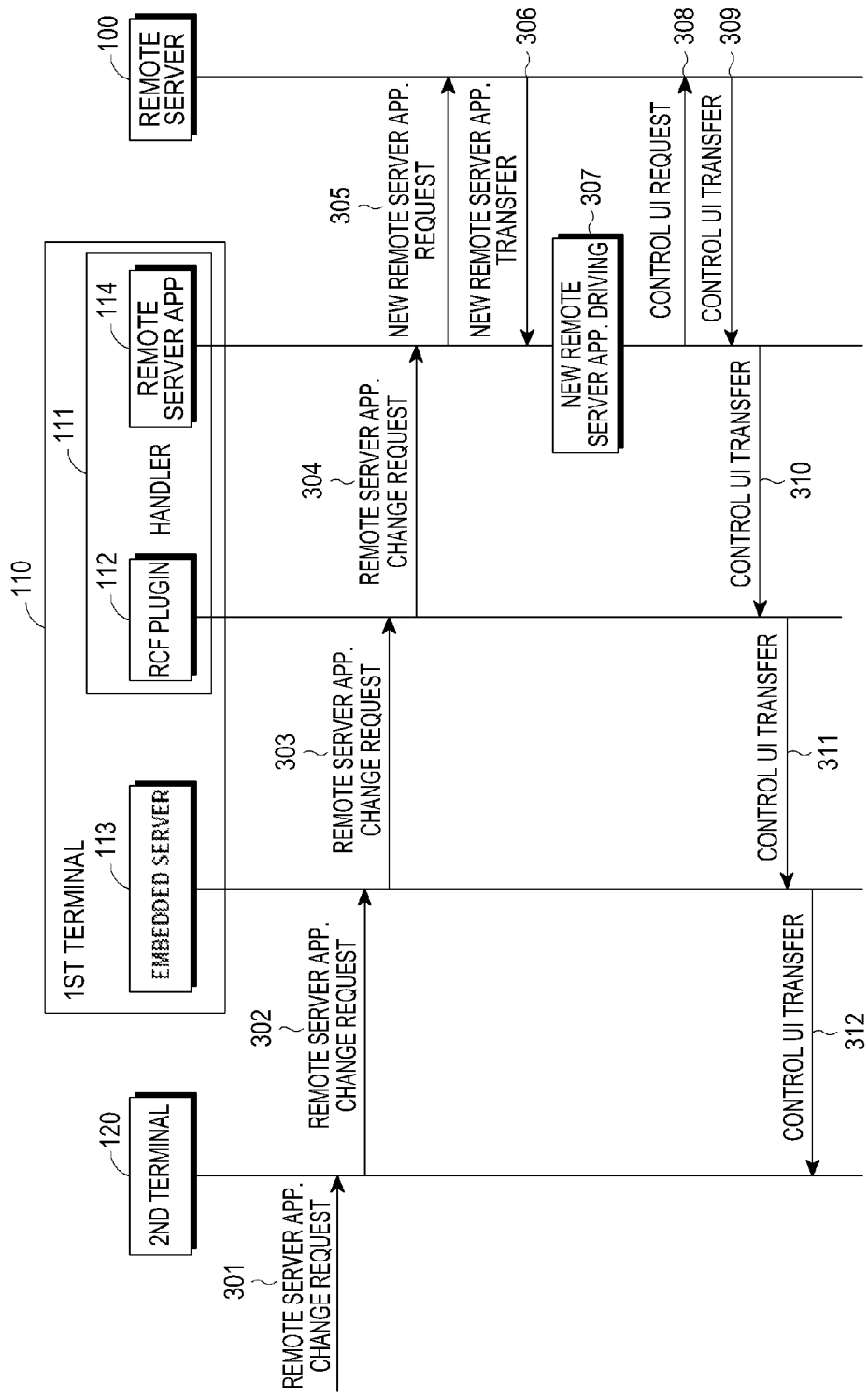
Figure 4:
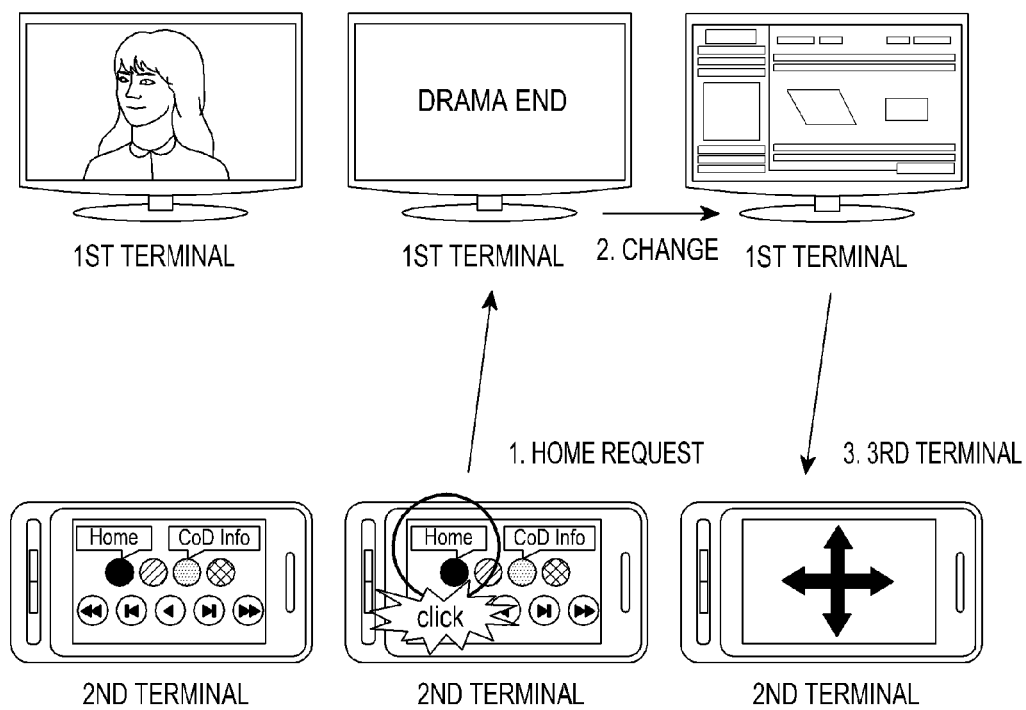
FIGS. 4 and 5 are screen views illustrating some problems associated with conventional methods of transferring a control UI to a second terminal.
Figure 5:
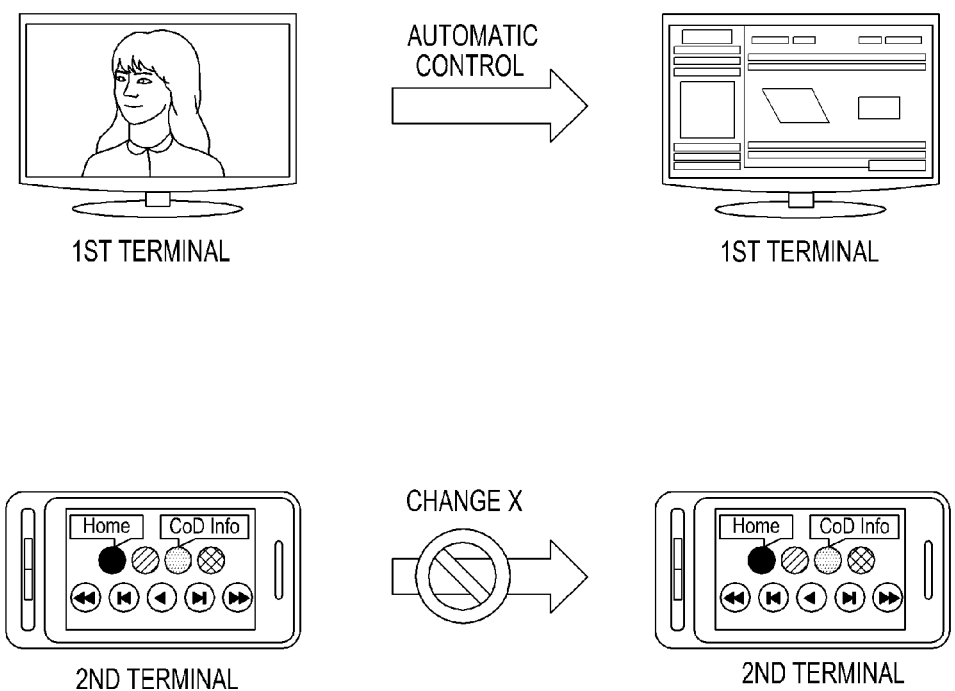
Figure 6:
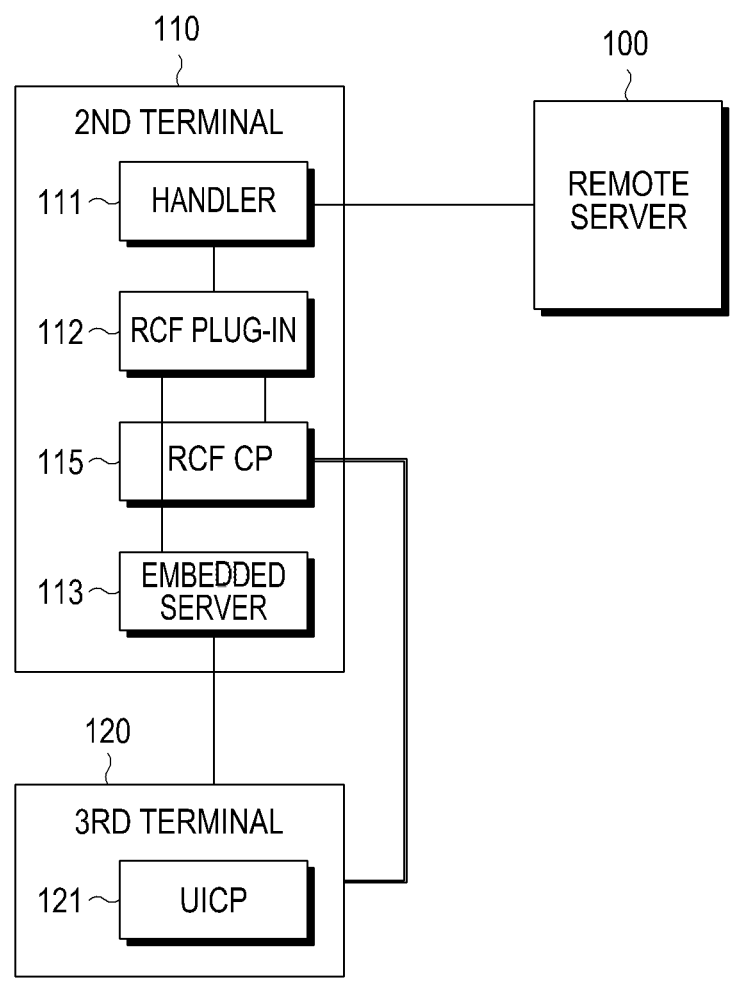
FIG. 6 is a block diagram illustrating a network structure for dynamically providing a control UI from a first terminal to a second terminal according to an embodiment of the present invention.

FIG. 6 is a block diagram illustrating a network structure for dynamically providing a control UI from the first terminal to the second terminal according to an embodiment of the present invention. Specifically, the network structure illustrated in FIG. 6 is basically the same as that of the conventional network illustrated in FIG. 1, except that an RCF Control Point (CP) 115 is added in a first terminal 610 for dynamically providing a second terminal 120 with a control UI. Accordingly, a repetitive description of the same components will not be described below.

Referring to FIG. 6, the second terminal 120 receives, through an embedded server 113, the control UI for controlling a remote server application (not shown).

The remote server application, which is driven in a handler 111, can control the RCF CP 115 through an Application Programming Interface (API) provided from an RCF plug-in 112. The RCF CP 115 receives a command Uniform Resource Identifier (URI) provided by the second terminal 120, adds a message to the command URI, and transmits it to the second terminal 120. The second terminal 120 extracts the message from the command URI transmitted from the RCF CP 115, and transmits the extracted message to the embedded server 113 of the first terminal 610. Thereafter, the extracted message is transferred to the remote server application via the RCF plug-in 112. The remote server application obtains the control UI from the remote server 100 and transmits the control UI to the second terminal 120.

Figure 7:
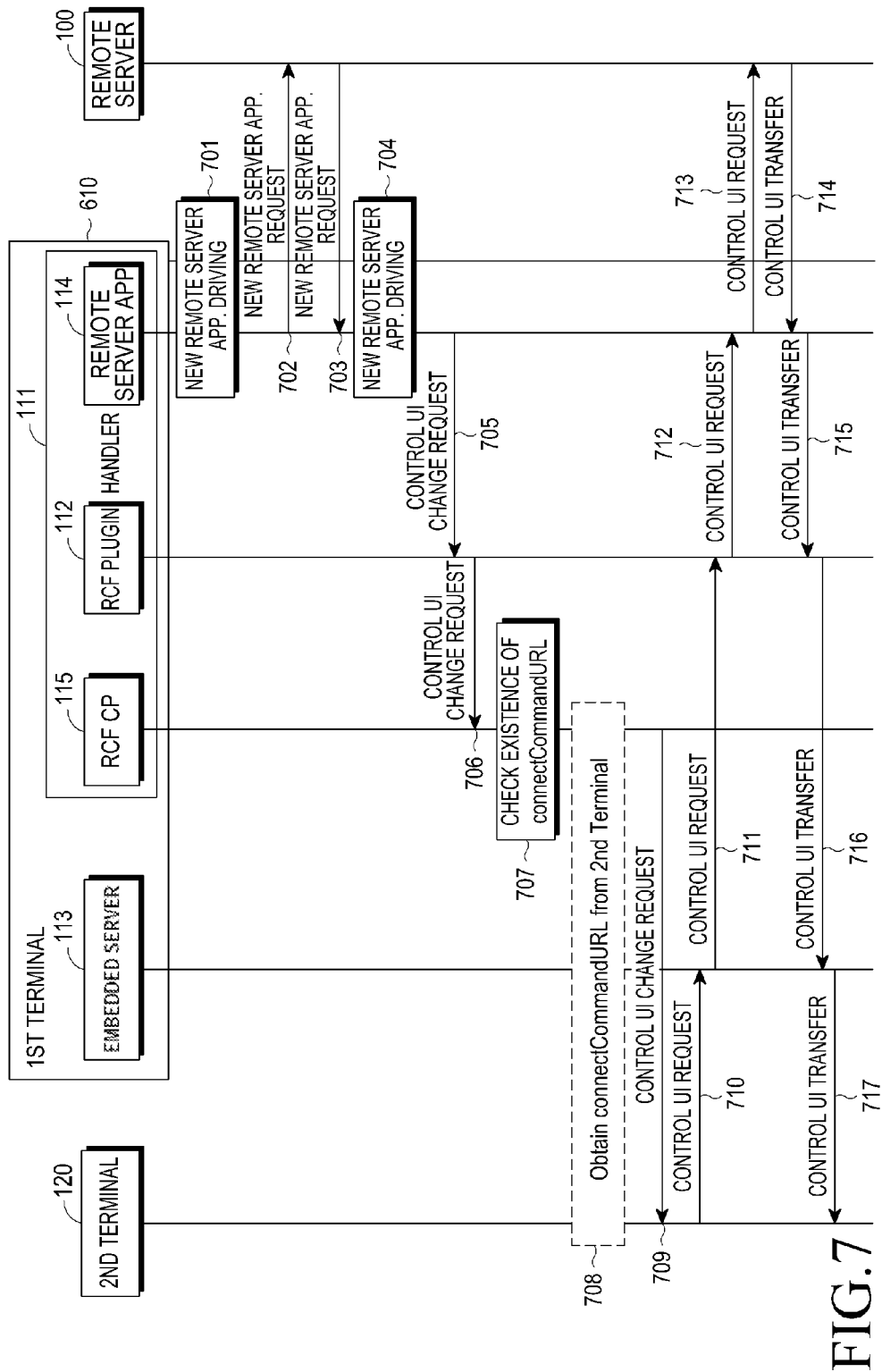
FIG. 7 is a signal flow diagram illustrating a method for providing a control UI from a first terminal to a second terminal in a remote UI system according to an embodiment of the present invention.

FIG. 7 is a flowchart illustrating a method for providing a control UI from a first terminal to a second terminal in a remote UI system according to an embodiment of the present invention.

Referring to FIG. 7, when the handler 111 of the first terminal 610 executes the remote server application 114 downloaded from the remote server 100 in step 701, and the remote server application 114 requests a new remote server application from the remote server 100 in step 702, the remote server 100 transmits the new remote server application in step 703, and the new remote server application is executed in the handler 111 in step 704.

In step 705, while the new remote server application is being executed, the remote server application 114 requests a control UI change from the RCF plug-in 112, using a request URL parameter value of a "changeCUI API". Accordingly, when the second terminal 120 requests the control UI, the parameter value is transferred to the embedded server 113 in the first terminal.

As illustrated in FIG. 8, the requestURL parameter value of the "changeCUI API" may be one of "/rcf/request_cui", "/rcf/request_msg", and "/rcf/create_app". The "/rcf/request_cui" is a URL for requesting the control UI and is used for transmitting a control UI request event to the remote server application 114 of the first terminal 610, and the remote server application 114 can acquire requested parameter values together with "/rcf/request_cui" by using the event. Further, based on the acquired parameter values, the remote server application 114 can take the control UI from the remote server and transmit the control UI to the second terminal 120. Also, the remote server application 114 may either take a control UI existing in the first terminal 610 and transmit the taken control UI to the second terminal 120 or transmit another control UI existing in the remote server application 114 itself to the second terminal 120.

The "/rcf/request_msg" is a command transmitting URL used for transmitting a command transferring event to the remote server application 114, and the remote server application 114 can acquire requested parameter values together with "/rcf/request_msg" from this event. Further, based on the acquired parameter values, the remote server application 114 may execute a particular command, take a control UI based on changed current state information from the remote server 100, and transmit the taken control UI to the second terminal 120. Also, the remote server application 114 may obtain a control UI existing in the first terminal 110 and transmit the obtained control UI to the second terminal 120 or transmit another control UI existing in the remote server application 114 itself to the second terminal 120.

The "/rcf/create_app" is a URL for requesting a creation of a new remote control server application. Based on this URL parameter, the remote server application 114 may create a new remote server application, obtain a control UI for controlling the new remote server application from the remote server 100, and transmit the new remote server application to the second terminal 120.

As described above, the remote server application 114 transfers a control UI changing request to the RCF IP 115 through the API provided from the RCF plug-in 115 in steps 705 and 706. In step 707, the RCF CP 115 determines whether the first terminal 610 has "connectCommandURL" provided from the second terminal 120. The "connectCommandURL" may be acquired and stored by the first terminal 610 during a procedure of capability-mating with the second terminal 120.

When the first terminal 610 does not have the "connectCommandURL", the RCF CP 115 obtains "connectCommandURL" existing in "uiClientInfo" of the second terminal 120 through a procedure of "Discovery & Description" through the embedded server 113 in step 708.

In step 709, after adding a message value that is to be used for a request by the second terminal 120 to the first terminal 610, to a rear position of "connectCommandURL" value, the RCF CP 115 requests a control UI change from the second terminal 120 through the "connectCommandURL" value to which the particular message value has been added.

The URL to which the particular message value has been added may have the following forms:
<connectCommandURL>?/rcf/request_cui?param1= value1¶m2=value2 . . . ,
where a value after the "<connectCommandURL>?" may be changed according to a "requestURL" parameter value of a changeCUI API provided from the RCF plug-in 112.

Upon receiving the request for the control UI change from the first terminal 610, in step 710, the second terminal 120 transfers "HTTP Request" based on the value following after "<connectCommandURL>?" to the embedded server 113 of the first terminal 610. In steps 711 to 717, as described above, the first terminal 610 provides the control UI to the second terminal 120 according to the value following after "<connectCommandURL>?".

According to the above-described embodiments of the present invention, an apparatus and a method are provided that can provide a control UI capable of controlling a new remote server application in a second terminal, even when a remote server application in a first terminal is changed into the new remote server application, without a request by the second terminal.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for providing a control user interface (UI) by a first terminal in a remote UI system, the method comprising:
receiving, by a first terminal, a new application from a remote server;
driving the new application, by the first terminal, without a request from a second terminal;
sending, by the first terminal, a UI change request message including (i) a parameter value indicating that the second terminal is to request a control UI for controlling the new application and (ii) a command sequence from the second terminal;
receiving, from the second terminal in response to the UI change request message, a message requesting the control UI for controlling the new application; and
providing the control UI for controlling the new application to the second terminal, in response to the message requesting the control UI, wherein providing the control UI to the second terminal comprises one of:
receiving the control UI for controlling the new application from the remote server and providing the received control UI to the second terminal; or
retrieving the control UI which is already stored in the first terminal and providing the retrieved control UI to the second terminal.

2. The method of claim 1, wherein the command sequence is provided by a Remote Control Function (RCF) Control Point (CP) in the first terminal.

3. The method of claim 1, wherein the parameter value indicating that the second terminal is to request a control UI for controlling the new application is "/rcf/request_cui", and other parameter values include "/rcf/request_msg"and "/rcf/create_app".

4. The method of claim 1, further comprising, when the first terminal does not have the command sequence;
connecting, by a Remote Control Function (RCF) Control Point (CP) in the first terminal, to the second terminal through an embedded server of the first terminal to obtain the command sequence from the second terminal.

5. The method of claim 1, further comprising:
adding, by a Remote Control Function (RCF) Control Point (CP) in the first terminal, a message value to the command sequence; and
transmitting the message value-added command sequence to the second terminal.

6. The method of claim 5, wherein the message value is changed according to the parameter value.

7. The method of claim 6, wherein, in response to receiving the message value-added command sequence, the second terminal performs one or more actions corresponding to the parameter value.

8. The method of claim 1, wherein the command sequence is a Universal Resource Locator (URL) for commanding the second terminal.

9. A first terminal capable of providing a control User Interface (UI) from a remote server to a second terminal which is capable of controlling the first terminal, the first terminal comprising:
a hardware processor that executes software, which controls the hardware processor to operate as:

a handler for driving a new application downloaded from the remote server, without a request from the second terminal, a Control Point (CP) for sending, to the second terminal, a UI change request message to change a control UI, based on control of the new application, the UI change request message including (i) a parameter value indicating that the second terminal is to request a control UI for controlling the new application and (ii) a command sequence from the second terminal, and an embedded server which, when a message requesting a new control UI for controlling the new application is received from the second terminal, provides the new control UI for controlling the new application to the second terminal; and a transceiver for receiving, from the second terminal, the message requesting the new control UI and providing the new control UI to the second terminal, under the control of the embedded server, wherein the embedded server either receives the new control UI for controlling the new application from the remote server and provides the received new control UI to the second terminal, or provides the control UI which is already stored in the first terminal to the second terminal.

10. The first terminal of claim 9, wherein the parameter value is provided from a Remote Control Function (RCF) plug-in.

11. The first terminal of claim 9, wherein the parameter value indicating that the second terminal is to request a control UI for controlling the new application comprises "/rcf/request_cui", and other parameter values include "/rcf/request_msg" and "/rcf/create_app".

12. The first terminal of claim 9, wherein, when the first terminal does not have the command sequence, the CP obtains the command sequence from the second terminal by performing a Device Discovery & Description procedure for connection to the second terminal through the embedded server.

13. The first terminal of claim 9, wherein the CP adds a message value to the command sequence and transmits the message value-added command sequence to the second terminal.

14. The first terminal of claim 13, wherein the message value changes according to the parameter value.

15. The first terminal claim 14, wherein, in response to receiving the message value-added command sequence, the second terminal performs one or more actions corresponding to the parameter value.

16. The method of claim 8, wherein the command sequence is connectCommandURL.

* * * * *